United States Patent Office 2,739,912
Patented Mar. 27, 1956

2,739,912

DYNAMOELECTRIC BRUSH AND METHOD OF MAKING SAME

Paul Smisko, St. Marys, Pa., assignor to Stackpole Carbon Company, St. Marys, Pa., a corporation of Pennsylvania No Drawing. Application November 9, 1954, Serial No. 467,887

10 Claims. (Cl. 117—223)

This invention relates to dynamoelectric brushes for use in sliding contact with metallic current collecting elements of dynamoelectric machines. The term "dynamoelectric brushes" as used herein contemplates brushes of the carbon, electrographitic and metal graphite types and is to be so understood.

Brushes of the type contemplated comprise a body of electrically conductive carbonaceous material, for instance graphite or coke, and mixtures thereof, with or without other substances such as lampblack and metallic additions. Initially the carbonaceous material is in finely divided form, it is mixed with a temporary binder, such as pitch or resin, and the mixture is molded to form plates, or blocks, which are subsequently heated with production of a residual carbon bond resulting from the binder. The nature, compositions and modes of production of such brushes are well known.

Such dynamoelectric brushes as produced for many years in general perform satisfactorily at the earth surface. More recently it has been found that at high altitudes or under conditions of low humidity brushes of the general type alluded to become subject to very severe and rapid wear which greatly reduces their operating life, reducing it in extreme cases to but a few minutes. That phenomenon is commonly referred to as dusting.

Brushes impregnated with various inorganic materials have been developed of recent years that afford prolonged life at high altitudes in comparison with untreated brushes. However, experience has shown that even with the best of such treated brushes it is not possible to avoid rapid disintegration, or dusting, at high altitudes unless the commutator, slip ring or the like, is first given a conditioning treatment at the earth surface prior to putting the dynamoelectric device into operation at high altitude. For instance, the best presently known high altitude, or aircraft, brushes if installed in a newly assembled generator with unused commutator surfaces and taken immediately to high altitude, will undergo dusting. Consequently, the consistent practice up to the present time has been to run in the metallic current collecting element against the brushes for periods of many hours at earth level. This involves, obviously, delays in production of dynamoelectric devices for use in aircraft or under conditions of very low humidity coupled with the economic disadvantages involved. Furthermore, despite having prolonged life as compared with untreated brushes, the available high altitude brushes operate at undesirably high temperature, even with preconditioned collector surfaces.

A primary object of the present invention is to provide dynamoelectric brushes that give improved life at high altitudes in comparison with the brushes known prior to this invention, i. e., which undergo greatly reduced wear per unit time of operation.

A special object is to provide such brushes which eliminate the conditioning, or breaking in, treatment that has been necessary with the previously known brushes.

Still another object is to provide brushes in accordance with the foregoing objects which operate at lower average temperatures under both earth surface and high altitude conditions than the previously known brushes.

Yet another object is to provide a method of making brushes in accordance with the foregoing objects that is simple, easily and economically practiced, and is applicable to the various compositions used for making dynamoelectric brushes.

The invention is predicated in large part upon my discovery that its stated objects are attained by dynamoelectric brushes comprising a body of electrically conductive carbonaceous material having incorporated therein lithium carbonate ($Li_2CO_3$). Such brushes have been shown by actual test to operate at lower average temperatures and to undergo greatly reduced wear per unit time than the best of the previously known brushes intended for operation at high altitude.

A particularly important advantage of these new lithium carbonate impregnated brushes is that they may be installed for operation with untreated commutators, or other current collecting elements, and immediately taken to high altitude and operated there without impairment of their desirable qualities whereby the objectionable conditioning of the current collecting elements that has heretofore been necessary is entirely eliminated.

Brushes in accordance with the invention may be produced readily by impregnating a block or plate of material for making dynamoelectric brushes, produced in accordance with standard practice, with a lithium compound that is convertible to lithium carbonate, after which such conversion is effected. This may be accomplished in various ways. For most purposes it is preferred to use lithium acetate ($LiC_2H_3O_2$) as the convertible lithium compound, for which reason its use is embodied in the following examples in which all proportions are stated in parts by weight.

In one mode of preparing brushes conforming to the invention plates of suitable material for making brushes are placed in a vacuum apparatus which is then evacuated, for instance to a pressure of the order of 10 mm. of mercury, whereupon there is introduced an aqueous solution of lithium acetate, suitably 45 parts of the acetate to 100 parts of water. When the plates have been covered the vacuum is broken and the plates are permitted to remain in the solution for a period of time, suitably one-half hour, at room temperature. They are then removed from the solution and dried, for instance at 450° F. for one-half hour. These steps may then be repeated, if desired, to introduce into the plates a predetermined amount of lithium acetate. In this embodiment when the carbon, electrographitic or metal graphite body has received the desired amount of lithium acetate it is heated to about 750° to 810° C., for example, 2 to 4 hours, preferably in a closed container, or sagger, and packed in carbon, for instance 20-mesh petroleum coke.

Conversion of lithium acetate to the carbonate will occur during heating in the sagger but to insure that the conversion is complete it is preferred to subject the body to a further treatment that involves impregnating it with an aqueous solution of ammonium carbonate $$[(NH_4)_2CO_3]$$

for instance 20 to 30 parts per 100 parts of water, using the vacuum technique described above. The body is then dried, for instance at 450° F. for 4 hours, after which it is exposed to an atmosphere of carbon dioxide ($CO_2$), suitably under a pressure of 20 to 30 p. s. i. during one hour. The product may then be vacuum dried, for instance at 190° F. during one and one-half hours, and the treated plates may then be cut into brushes. This treatment may, of course, be applied to bodies of dynamoelectric material initially molded to brush size and shape.

Another method that has been used for making brushes in accordance with the invention is to impregnate the body of dynamoelectric brush material with a solution of 30 parts of anhydrous lithium acetate in 100 parts of water by the vacuum technique described above. Most of the water is then driven off and the body is then soaked in a solution of ammonium carbonate, for instance 30 parts in 100 parts of water, for a period of time, say 4 hours, to convert the acetate to the carbonate. The resultant ammonium acetate is then driven off, as by heating for 2 hours at 450° F., thus leaving lithium carbonate in the dynamoelectric body. These steps may be repeated, if necessary, to develop the desired amount of lithium carbonate in the body. The body is finally baked, suitably at 500° C. for 4 hours.

Still another way of making brushes in accordance with the invention is to vacuum impregnate, for instance as described above, the dynamoelectric body with a solution of lithium hydroxide monohydrate ($LiOH \cdot H_2O$) in water, a suitable solution being 11.5 parts of the hydroxide to 100 parts of water. The impregnated plate is then dried, for example at 300° F. for 2 hours, after which it is similarly impregnated with a solution of ammonium carbonate, suitably 20 parts in 100 parts of water, after which the plates are heated at 450° F. to drive off the ammonia that results from the conversion of the lithium hydroxide to the carbonate. This treatment may be repeated as necessary to incorporate the desired amount of lithium acetate in the body of dynamoelectric brush material.

Other modes of preparing the brushes may, of course, be used.

In general the dynamoelectric brush may contain from about 0.5 to about 20 per cent by weight of lithium carbonate, the exact amount depending, as those familiar with this field will recognize, upon the particular use to which the brush is to be put. For most purposes it is preferred that the content of lithium carbonate be from about 6 to 12 per cent, and preferably from about 7 to 8.5 per cent.

As evidencing the superiority of brushes according to this invention in comparison with those available heretofore, reference may be made to one test in which electrographitic brushes were installed in a 400 ampere, 30 volt, 3,000 to 8,000 R. P. M. direct current aircraft generator that takes 18 brushes. In one test the brushes were those that are recognized as standard for a high altitude operation and are used predominantly over other types for that purpose. In a 90.5-hour run the average temperature rise of the brushes was 160° C. and there was an overall wear of 0.53 mil per hour. The brushes were then replaced with lithium carbonate impregnated brushes of this invention containing between 7 and 8.5 per cent by weight of the carbonate. In a 103.6-hour run the average temperature rise of these brushes was but 132° C., the over-all wear was only 0.24 mil per hour, and the brushes gave improved commutation.

Other comparative tests have been carried out in an altitude chamber in accordance with specifications of the Army Air Force. In these tests the altitude represented was 50,000 feet. In one test of the accepted standard brushes the average temperature rise was 222° C. and the over-all wear 1.72 mils per hour, while in another test the average temperature rise was 237° C. and the over-all wear 1.58 mils per hour. In comparison, using lithium carbonate impregnated brushes according to the preferred embodiment of the invention the average temperature rise of the brushes in one test was 187° C. and the over-all wear but 0.65 mil per hour, while in another test the average temperature rise was 190° C. and the over-all wear only 0.51 mil per hour.

The foregoing tests, typical of many others, indicate clearly the marked superiority of the brushes of this invention over the brushes heretofore considered to be the best for high altitude work.

As indicated above, with the previously available brushes, it has been absolutely requisite for high altitude work that before being used the current collecting element be given a so-called filming (conditioning) treatment that is requisite if dusting is to be avoided when the dynamoelectric device is taken to high altitude and put into operation. In another altitude chamber test representing flight at 50,000 feet there was used a commutator with a freshly prepared clean metallic surface and the standard high altitude brushes. After 9 hours' operation the average temperature rise was 209° C. and the over-all wear was 17.6 mils per hour, which is excessive inasmuch as some specifications fix one mil per hour as the maximum permissible wear. In a similar test, again using a commutator having a freshly prepared clean metallic surface and substituting lithium carbonate impregnated brushes containing the preferred amount of carbonate, after 9 hours' operation the average temperature rise was only 173° C. and the over-all wear only 0.46 mil per hour. Thus the brushes of this invention rendered wholly unnecessary the previously requisite filming, or conditioning, treatment that was unavoidable prior to this invention if dusting with resultant short brush life at high altitudes was to be avoided.

So-called bell jar tests are likewise revealing of the marked superiority of the brushes of this invention. In one test the standard aircraft brushes were run for 30 minutes against a slip ring device in a bell jar through which there was circulated air dried to dew point below minus 90° C. The brushes were then heated in an oven to 300° C. for a minimum of 15 minutes after which they were reinstalled in the bell jar which was evacuated to a pressure of the order of 0.1 mm. mercury with heat lamps applied during about 20 hours to draw off gas or vapor from the inner walls and the apparatus. The vacuum was then adjusted to various simulated altitudes to determine that at which dusting would occur. In the case of the standard aircraft brushes that happened at between 25,000 and 30,000 feet. In comparison, the brushes of this invention did not dust until the pressure simulated an altitude of 60,000 feet. This test does not necessarily correspond to flight altitudes but for the purposes to which it is applied it gives relative comparisons. In another series of bell jar tests the brushes were heated in an oven as just described and then installed against an unconditioned ring, that is, one not previously turned over against a brush. In this test the standard aircraft brushes dusted at a simulated 5,000 feet altitude, and in some instances lower, while the brushes of this invention did not dust until a relative altitude of 35,000 feet was developed. This series of tests again demonstrates how failure to condition the previously available aircraft brushes results in the disastrous dusting whereas in comparison conditioning is wholly unnecessary to avoid dusting with the new lithium carbonate impregnated brushes.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A dynamoelectric brush capable of prolonged life at high altitude comprising a body of electrically conductive carbonaceous material having from about 0.5 to about 20 per cent of lithium carbonate distributed in the body.

2. A dynamoelectric brush capable of prolonged life at high altitude comprising a carbon bonded body of graphite having from about 0.5 to about 20 per cent of lithium carbonate distributed in the body.

3. That method of making a dynamoelectric brush from a porous body of electrically conductive carbonaceous material comprising the steps of impregnating said body with a compound of the group consisting of lithium hydroxide and lithium acetate, and heating the impregnated body at a temperature and for a time to convert the lithium compound thus incorporated in the body to lithium carbonate.

4. That method of making a dynamoelectric brush from a porous body of electrically conductive carbonaceous material comprising the steps of impregnating said body with an lithium acetate, and then heating the body at a temperature and for a time to convert the lithium acetate thus incorporated in the body to lithium carbonate.

5. That method of making a dynamoelectric brush from a porous body of electrically conductive carbonaceous material comprising the steps of impregnating said body with an aqueous solution of lithium acetate, drying the impregnated body, then impregnating the body with an aqueous solution of ammonium carbonate, again drying, and finally heating at a temperature of at least about 450° F. for a time to convert the lithium aceate to lithium carbonate.

6. That method of making a dynamoelectric brush from a porous body of electrically conductive carbonaceous material comprising the steps of impregnating said body with lithium acetate, and heating the impregnated body at about 750° to about 810° F. for a time to convert the lithium aceate to lithium carbonate.

7. A method according to claim 6 in which said steps are repeated to incorporate a predetermined amount of said acetate in said body.

8. That method of making a dynamoelectric brush from a porous body of electrically conductive carbonaceous material comprising the steps of impregnating said body with an aqueous solution of lithium aceate, then drying the impregnated body, then heating the body at about 750° to about 810° F. in a closed container, for a time to convert the acetate to the carbonate, thereafter impregnating the body with an aqueous solution of ammonium carbonate, then drying at about 450° F., and then heating in an atmosphere of carbon dioxide.

9. A method according to claim 8 in which the body is finally heated to about 190° F. under vacuum.

10. That method of making a dynamoelectric brush from a porous body of electrically conductive carbonaceous material comprising the steps of impregnating said body with an aqueous solution of lithium acetate, then drying the impregnated body, then heating the body at about 750° to about 810° F., while packed in carbon in a closed container, for a time to convert the acetate to the carbonate, repeating said steps, if need be, to incorporate a predetermined amount of lithium acetate in the body, then impregnating the body with an aqueous solution of ammonium carbonate, then drying at about 450° F., and then heating in an atmosphere of carbon dioxide.

References Cited in the file of this patent

UNITED STATES PATENTS

| | | |
|---|---|---|
| 2,445,003 | Ramadanoff | July 13, 1948 |
| 2,530,984 | Moberly | Nov. 21, 1950 |
| 2,699,404 | Ramadanoff | Jan. 11, 1955 |